United States Patent
Fahim

[19]

[11] Patent Number: 6,149,235
[45] Date of Patent: Nov. 21, 2000

[54] ROTARY-CAM TYPE RECLINING DEVICE

[75] Inventor: Masroor Fahim, Westland, Mich.

[73] Assignee: Lear Corporation, Southfield, Mich.

[21] Appl. No.: 09/373,871

[22] Filed: Aug. 13, 1999

[51] Int. Cl.[7] .................................................. B60N 2/02
[52] U.S. Cl. ................. 297/259.2; 297/367; 297/378.12
[58] Field of Search ................................ 297/259.2, 367, 297/378.12, 363, 364, 365

[56] References Cited

U.S. PATENT DOCUMENTS

| | | | |
|---|---|---|---|
| 5,161,856 | 11/1992 | Nishino | 297/378.12 X |
| 5,590,931 | 1/1997 | Fourrey et al. | 297/367 X |
| 5,622,407 | 4/1997 | Yamada et al. | 297/367 X |
| 5,681,086 | 10/1997 | Baloche | 297/367 |
| 5,755,491 | 5/1998 | Baloche et al. | 297/367 X |
| 5,762,400 | 6/1998 | Okazaki et al. | 297/367 |
| 5,769,494 | 6/1998 | Barrere et al. | 297/367 |

*Primary Examiner*—Peter M. Cuomo
*Assistant Examiner*—Stephen Vu
*Attorney, Agent, or Firm*—Brooks & Kushman P.C.

[57] ABSTRACT

A rotary-cam type reclining device includes a base adapted to be fixed to a seat cushion, and an arm adapted to be fixed to a seat back and rotatably connected to the base. The arm includes an inner toothed portion. First, second and third pawl arms are pivotally connected to the base. Each pawl arm has an outer toothed portion along an outer edge thereof engageable with the inner toothed portion, and includes a cam contour surface along an inner edge thereof. A rotary cam has first, second and third cam arms engageable with the first, second and third pawl arms, respectively. Each cam arm has a cam profile surface that is in cam connection with the contour surface of the respective pawl arm for producing inward and outward radial motions of the respective pawl arm to mesh and unmesh the inner and outer toothed portions by a rotary motion of the rotary cam. An operating lever is mechanically linked to the rotary cam for producing the rotary motion of the rotary cam. A single spring biases the rotary cam with respect to the base whereby each of the first, second and third pawl arms are forced into meshing engagement with the inner toothed portion.

9 Claims, 8 Drawing Sheets

ROTARY-CAM TYPE RECLINING DEVICE

TECHNICAL FIELD

The present invention relates to a rotary-cam type reclining device having three pawl arms pivotally connected to a base and simultaneously operated by a cam for locking and unlocking the reclining device.

BACKGROUND OF THE INVENTION

Rotary-cam type reclining devices are suitable for use in automobile reclining seats. The device is lockable by way of a rotary motion of the rotary cam mechanically linked to a reclining lever for forward and backward angular adjustment of a seat back relative to a seat cushion.

A typical rotary-cam type reclining device includes a base fixed to a seat cushion and having a recessed portion formed with two opposing parallel sidewalls, an arm fixed to a seat back and rotatably supported by the base via a pivot shaft and two toothed blocks slidably guided in the two opposing parallel sidewalls in the base. A reclining lever is integrally connected to the pivot shaft and a rotary-cam is fixed to the pivot shaft and is operative to mesh or unmesh the radially sliding toothed locks with or from the inner toothed portion of the arm by way of rotation of the rotary cam.

All known prior art rotary-cam type reclining devices have radially slidable locking members. For example, U.S. Pat. No. 5,873,630 includes a base fixed to a seat cushion, a toothed arm fixed to a seat back and rotatably supported on the base, and a radially slidable toothed block slidably disposed between the base and the arm and having an outer toothed portion and a cam contour surface slidably guided by two parallel sidewalls of a recessed toothed block guide. A rotary cam produces outward and inward sliding motions of the toothed block to mesh and unmesh the outer toothed portion of the toothed block.

The '630 patent recognizes the need for improved mechanical strength in such typical rotary-cam type reclining devices, and also recognizes the undesirability of simply increasing the thickness of various components to increase the mechanical strength of the reclining device, as well as the undesirability of using an expensive high strength steel. In order to improve mechanical strength, the '630 patent provides an auxiliary interlocking member which is responsive to deformation of the toothed block resulting from impact applied to the arm. The interlocking member locks the rotary-cam type reclining device by meshing engagement with the inner toothed portion of the arm. However, this design merely adds additional parts to the assembly, thereby resulting in increased manufacturing and assembly costs.

It is therefore desirable to provide an improved rotary-cam type reclining device wherein mechanical strength is improved without increasing manufacturing costs or weight.

DISCLOSURE OF INVENTION

The present invention overcomes the above-referenced shortcomings of prior art rotary-cam type reclining devices by providing a rotary-cam type reclining device which includes three pawl arms pivotally connected to the base. The three pawl arms are arranged in a manner that they create a triangle between the point of contact of the teeth, the pivot point of the pawl and the pivot point of the cam. Triangular loading with metal-to-metal contact provides improved strength and improved reliability. Also, the device is provided with a single spring which simultaneously biases the three pawl arms into locking engagement with the inner toothed portion.

More specifically, the invention provides a rotary-cam type reclining device including a base adapted to be fixed to a seat cushion, and an arm adapted to be fixed to a seat back and rotatably connected to the base, wherein the arm has an inner toothed portion. First, second and third pawl arms are pivotally connected to the base. Each pawl arm has an outer toothed portion along an outer edge thereof engageable with the inner toothed portion. Each pawl arm also has a cam contour surface along an inner edge thereof. A rotary cam includes first, second and third cam arms engageable with the first, second and third pawl arms, respectively. Each cam arm has a cam profile surface that is in cam connection with the cam contour surface of the respective pawl arm for producing inward and outward radial motions of the respective pawl arm to mesh and unmesh the inner and outer toothed portions by a rotary motion of the rotary cam. An operating lever is mechanically linked to the rotary cam for producing the rotary motion of the rotary cam.

Preferably, a single spring biases the rotary cam with respect to the base whereby each of the first, second and third pawl arms are forced into meshing engagement with the inner toothed portion.

Accordingly, an object of the invention is to provide an improved rotary-cam type reclining device with increased mechanical strength without increased manufacturing costs and weight.

A further object of the invention is to provide an improved rotary-cam type reclining device with a reduced part count, reduced weight and reduced number of moving parts.

The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
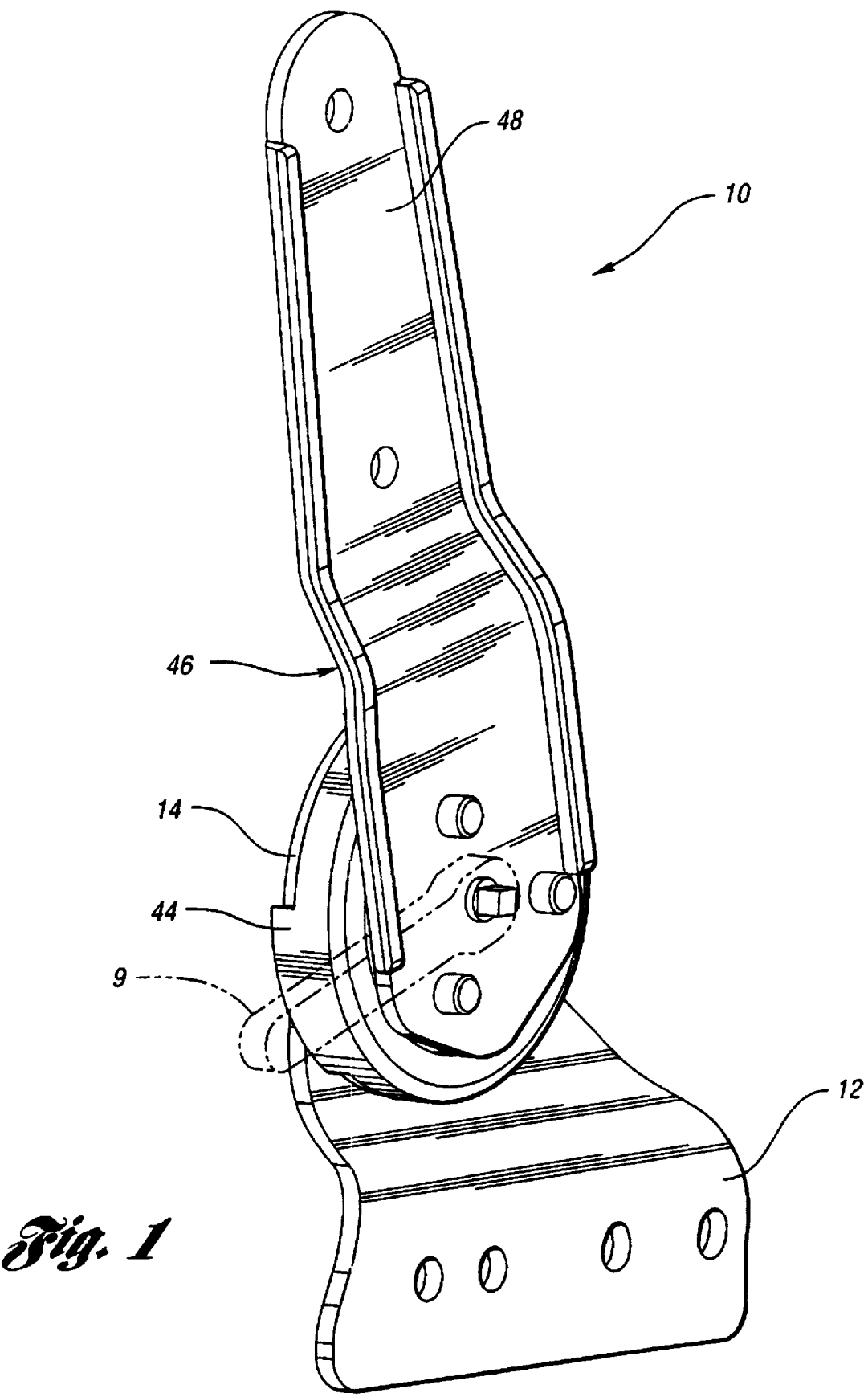
FIG. 1 shows a perspective view of a rotary-cam type reclining device in accordance with the present invention.
Figure 2:
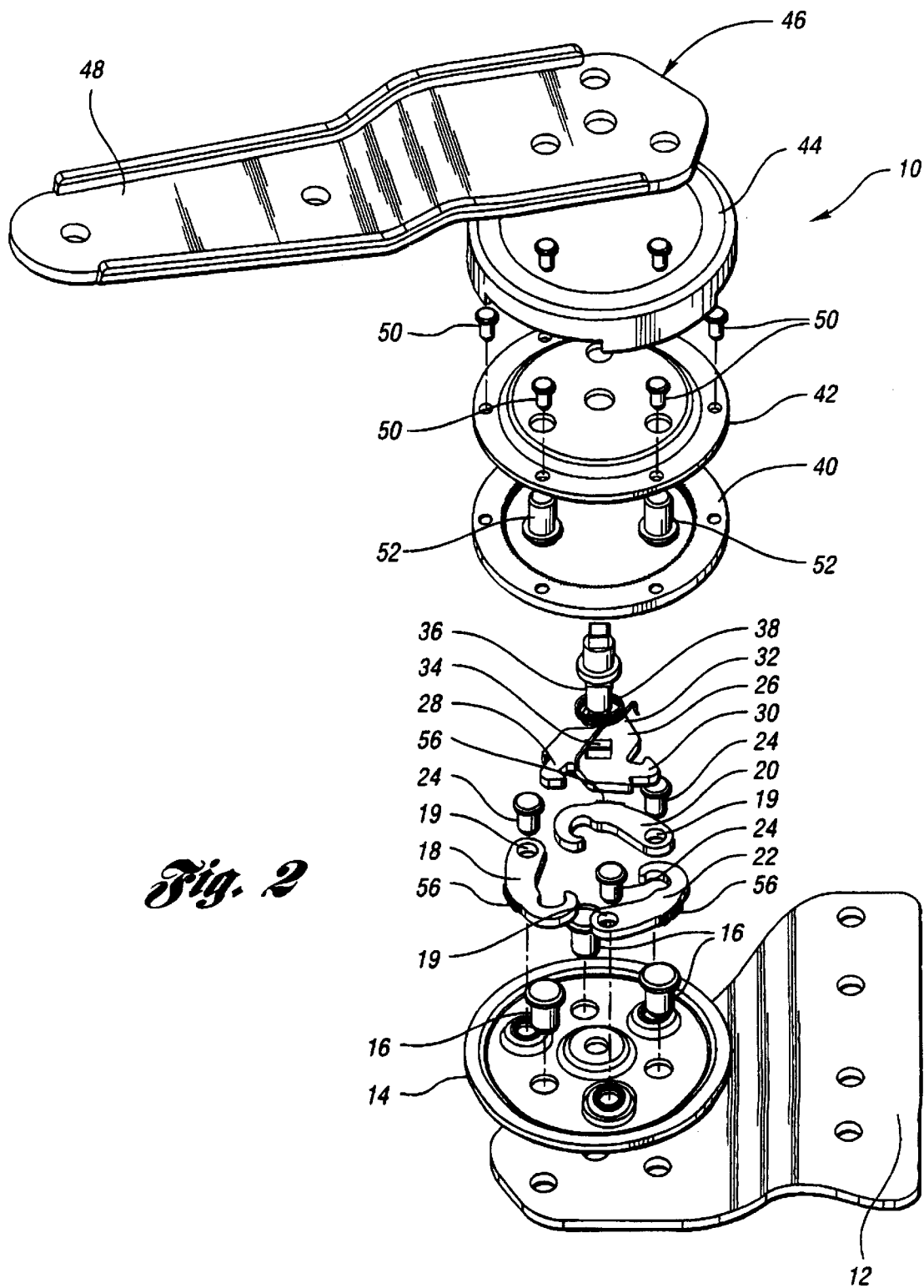
FIG. 2 shows an exploded perspective view of the device of FIG. 1.

The rotary-cam type recliner device 10 of the present invention is shown in FIGS. 1 and 2. A base 12 is adapted to be fixed to a seat track or seat adjuster, and thereby fixed with respect to a seat cushion of a vehicle. The base 12 includes a backplate 14 connected thereto by studs 16. Pawl arms 18,20,22 are pivotally connected to the backplate 14 by the studs 24.

The cam 26 includes first, second and third cam arms 28,30,32, and has a central aperture 34 for receiving a cam shaft 36. A rotary spring 38 is positioned around the cam shaft 36, and engages the base 12 at one end, and the rotary cam 26 at the opposite end. A toothed ring 40, front plate 42 and locking ring 44 are connected to form integral parts of the arm 46. The arm 46 has an upper portion 48 adapted to be connected to a seat back for pivotal movement therewith. The rivets 50 secure the front plate 42 to the toothed ring 40. The front plate 42 also holds the studs 52 for the upper bracket.

Figure 3:
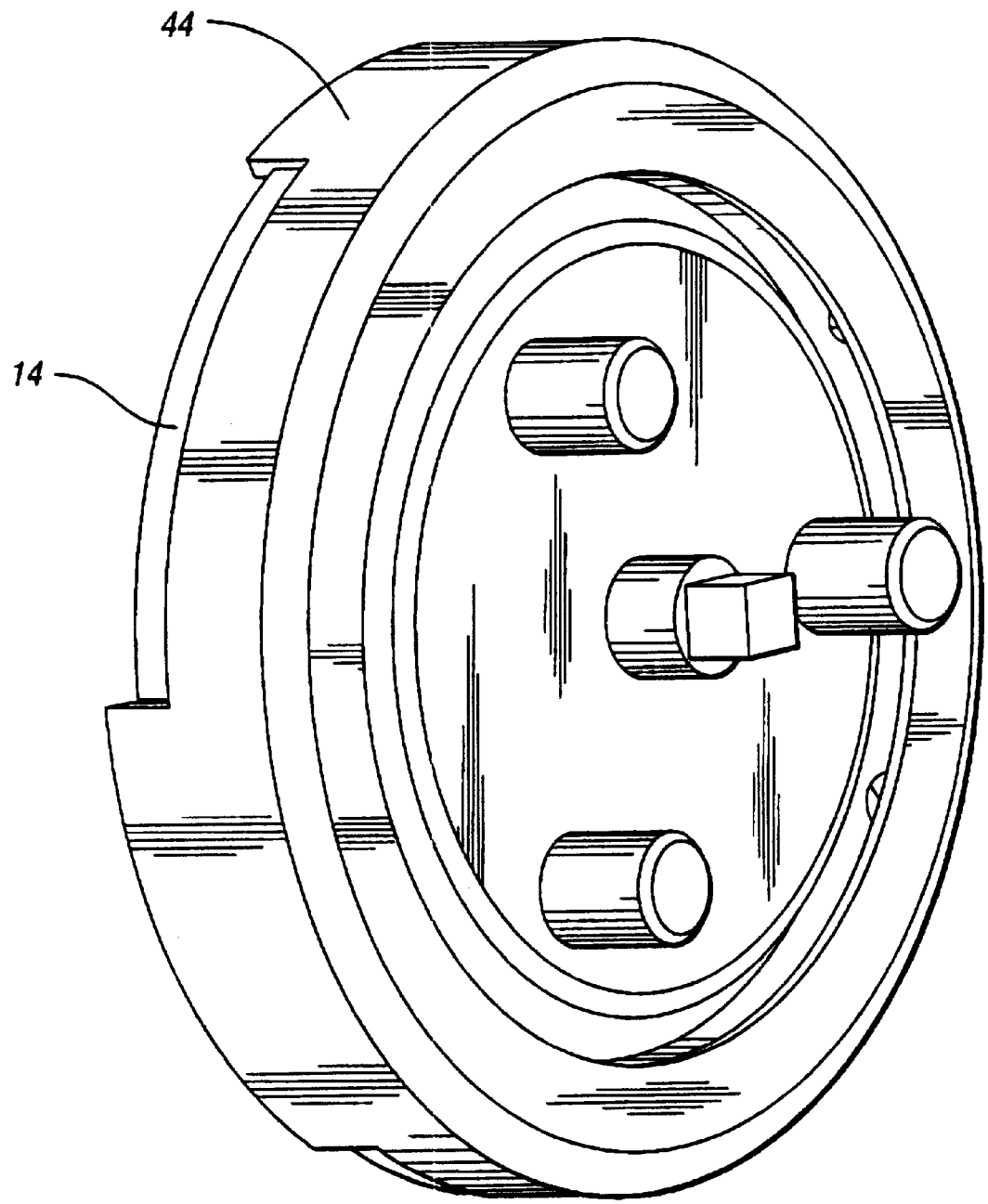
FIG. 3 shows a perspective view of the device of FIG. 1, with the base and arm removed.

To complete the assembly, the locking ring 44 is secured to the backplate 14, and the base 12 and arm (upper bracket) 46 are attached. FIG. 3 shows a perspective view of the resulting sub-assembly when the locking ring 44 is connected with the backplate 14.

The recliner mechanism 10 works in the following manner. When the vehicle occupant manually rotates the operating lever 9, shown in phantom in FIG. 1, the lever 9 rotates the cam shaft 36, which in turn rotates the cam 26. As the cam 26 rotates about its pivot point (the middle of the cam shaft 36), it pulls all three pawls 18,20,22 away from the toothed ring 40 and allows the seatback to rotate.

Figure 4:
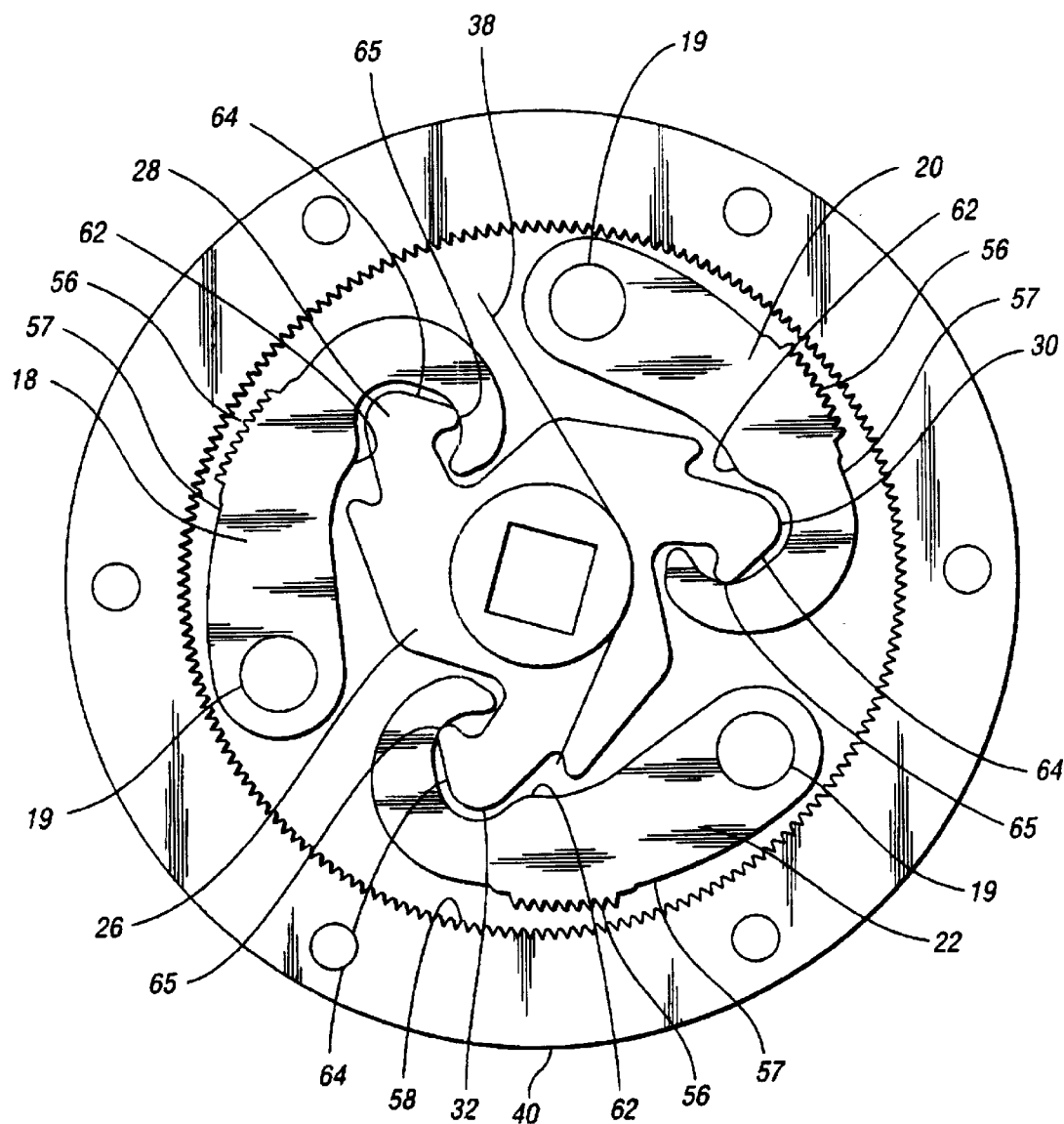
FIG. 4 shows a plan view of the interior of the reclining device with the pawl arms in the unlocked position.
Figure 5:
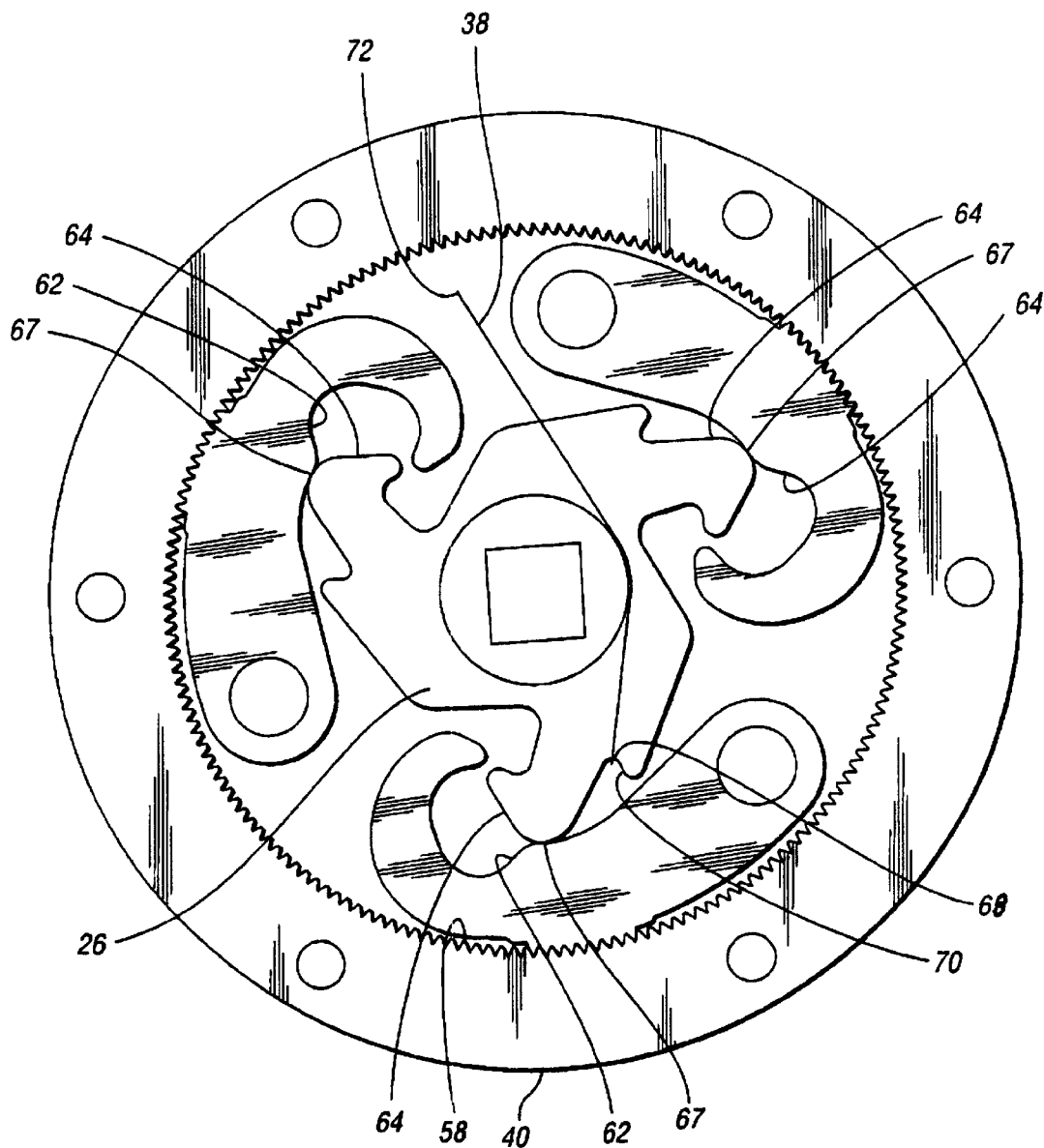
FIG. 5 shows a plan view of the device of FIG. 4 with the pawl arms in the locked position.
Figure 6:
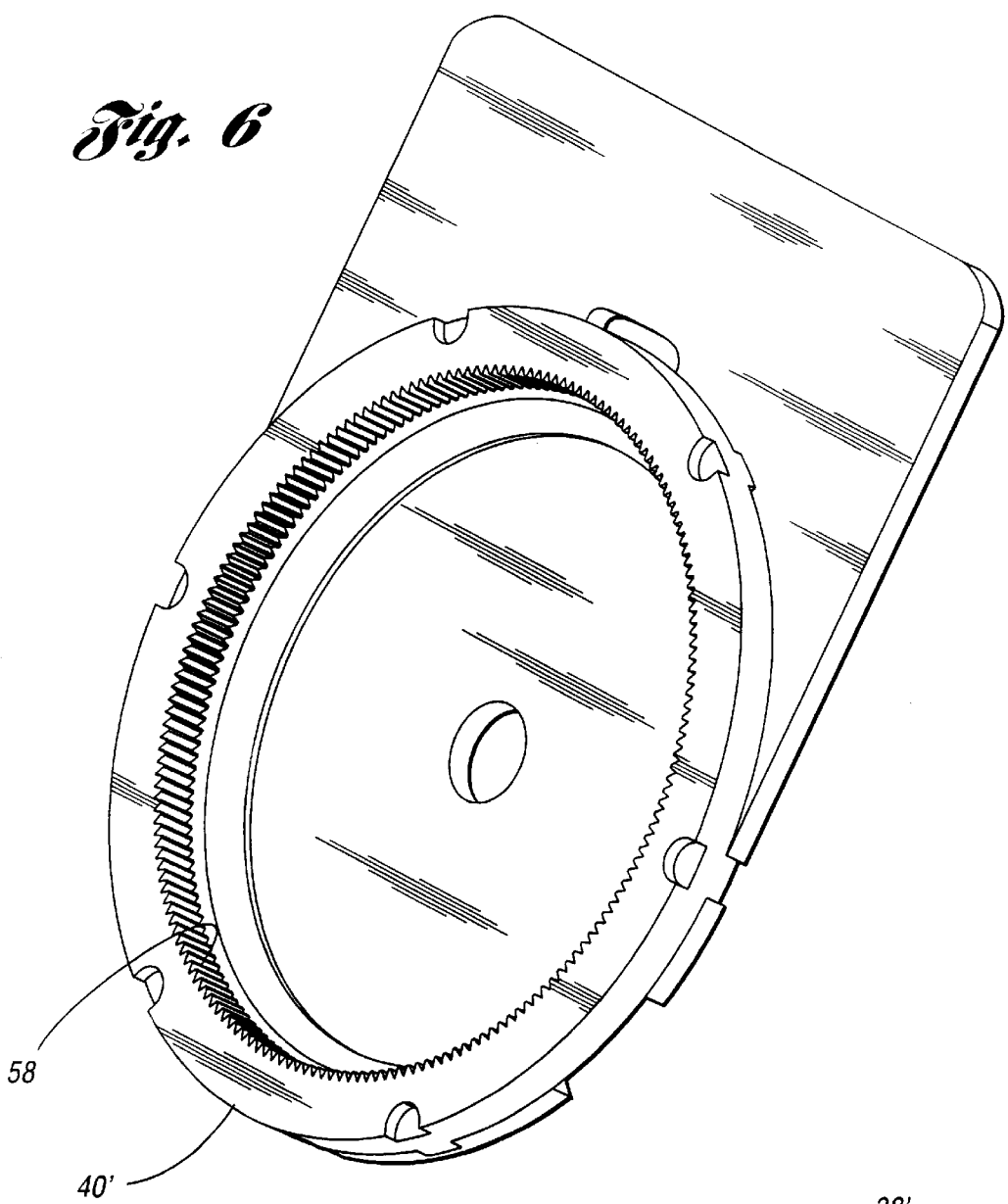
FIG. 6 shows a perspective view of an arm in accordance with a slightly alternative embodiment of the invention.

When the vehicle occupant releases the lever 9, the torsional spring 38 rotates the cam 26 back to its original position which pivots the first, second and third pawl arms 18,20,22 toward the toothed ring 40 for locking, and thereby engages the outer toothed portion 56 of each pawl arm 18,20,22 with the inner toothed portion 58 with the toothed ring 40 for locking, shown in FIGS. 4, 5 and 6.

Accordingly, the cam 26 and pawl arms 18,20,22 are designed to work inside the toothed ring 40. The cam 26 is designed to control the pull and push of all three pawl arms 18,20,22 at the same time.

The three pawl arms 18,20,22 are radially spaced equidistantly with respect to the camshaft about the base and are arranged in a manner that they create a triangle between the point of contact of the inner and outer toothed portions 56,58, the pivot point 19 of each pawl 18,20,22, and the pivot point of the cam 26 (i.e., the center of the cam shaft 36). Triangular loading with metal-to-metal contact provides higher strength and improved reliability. Also, the mechanism is designed to ensure positive locking by slightly offsetting one of the outer toothed portions 56 with respect to the inner toothed portion 58, thereby ensuring that at least one outer toothed portion 56 becomes immediately locked onto the inner toothed portion 58 when the pawl arms 18,20,22 engage the inner toothed portion 58.

This mechanism will have application in a wide range of seats. It is a simple and low cost design with slim packaging and positive locking features. The system is easy to manufacture with reduced number of moving parts. It can be used as a single or dual-sided recliner with either cable or torque rod actuation.

The movement of the cam 26 and pawl arms 18,20,22 is more readily understood with reference to FIGS. 4 and 5. As shown, each of the pawl arms 18,20,22 includes an outer toothed portion 56 along an outer edge 57 thereof. Each pawl arm 18,20,22 also includes a cam contour surface 62 along an inner edge thereof.

Each cam arm 28,30,32 includes a cam profile surface 64 along an outer edge thereof which is in cam connection with the cam contour surface 62 of the respective pawl arm 18,20,22 for producing inward and outward radial motions of the respective pawl arms 18,20,22 about their pivot points 19 as a result of rotary motion of the cam 26.

FIG. 4 shows the pawl arms 18,20,22 held in the unlocked position wherein the cam contour surface 62 and cam profile surface 64 meet at the engagement point 65 of the respective cam arms and pawl arms.

FIG. 5 shows the outer toothed portion 56 of each pawl arm 18,20,22 forced into locking engagement with the inner toothed portion 58 of the toothed ring 40 as a result of the cam contour surface 62 engaging the cam profile surface 64 at the engagement point 67 of each respective cam arm and pawl arm. The rotary spring 38 forces each cam profile surface 64 against the respective cam contour surface 62 at the engagement points 67, thereby holding each pawl arm in locking engagement with the inner toothed portion 58 of the ring 40. The rotary spring 38 is engaged at one end 68 in a groove 70 of the cam 26, and is engaged at an opposite end 72 with the base (not shown) to provide such rotary bias on the cam 26. This engagement at the opposite end 72 is provided by inserting the opposite end 72 through a hole formed in the base 12.

Figure 7:
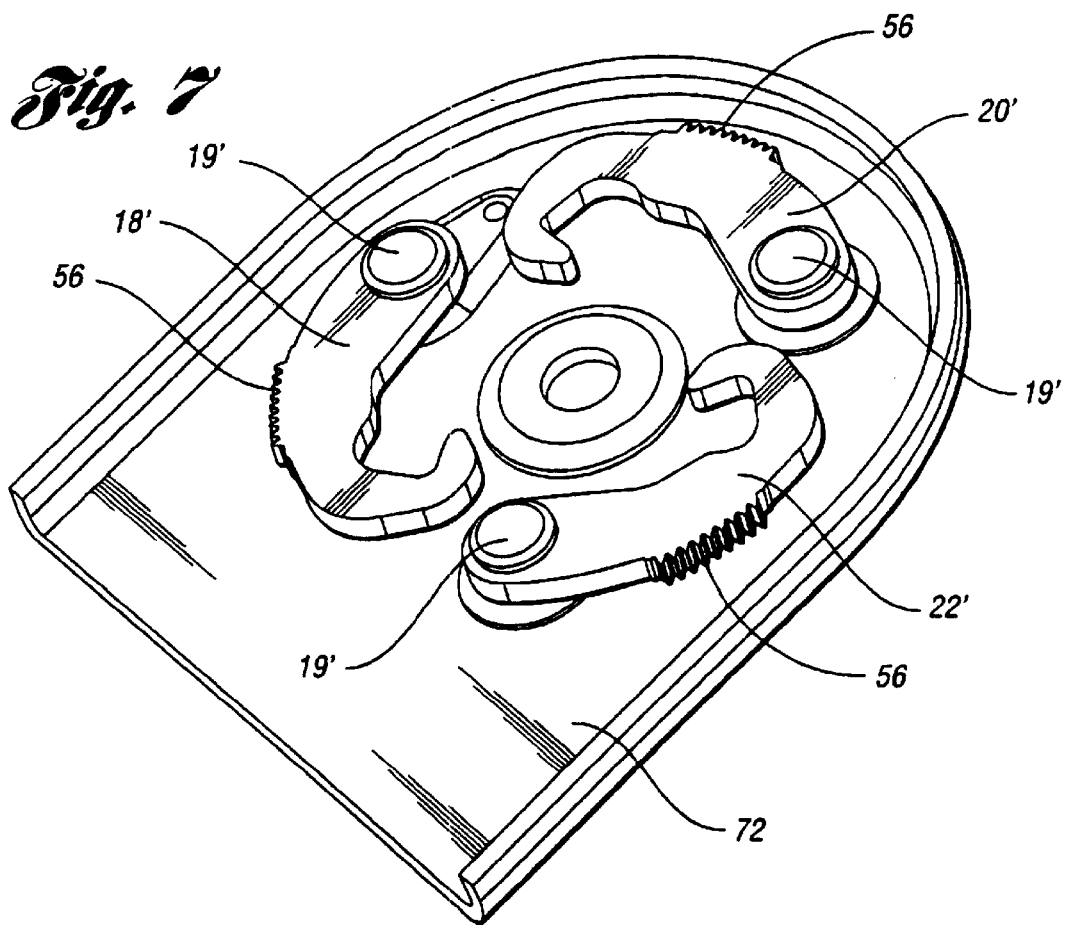
FIG. 7 shows a perspective view of the base and pawl arms for use with the embodiment of FIG. 6.

FIGS. 6–13 illustrate a slightly modified embodiment of the inventor which is functionally identical to that described in the embodiment of FIGS. 1–5 and in which like components are identified by like reference numbers. As shown in FIG. 6, in this embodiment, the base and cam ring have been combined into a single component 40', which includes the identical inner toothed portion 58. Also, the pawl arms 18',20',22' shown in FIG. 7 are slightly modified in shape, but include the identical outer toothed portion 56, and are supported by a plate 72 via pivot pins 19'.

Figure 8:
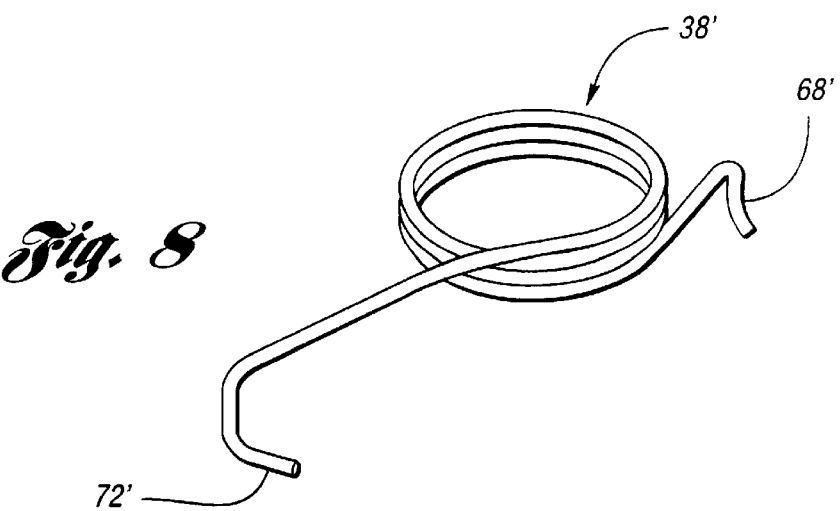
FIG. 8 shows a perspective view of a rotary spring for use with the embodiment of FIG. 6.
Figure 9:
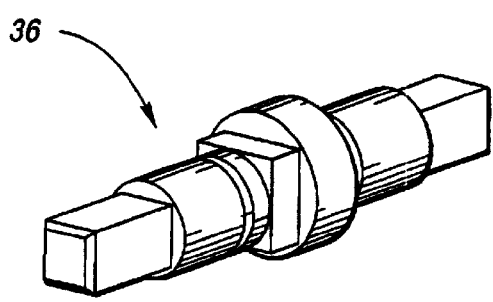
FIG. 9 shows a perspective view of a cam shaft for use with the embodiment of FIG. 6.
Figure 10:
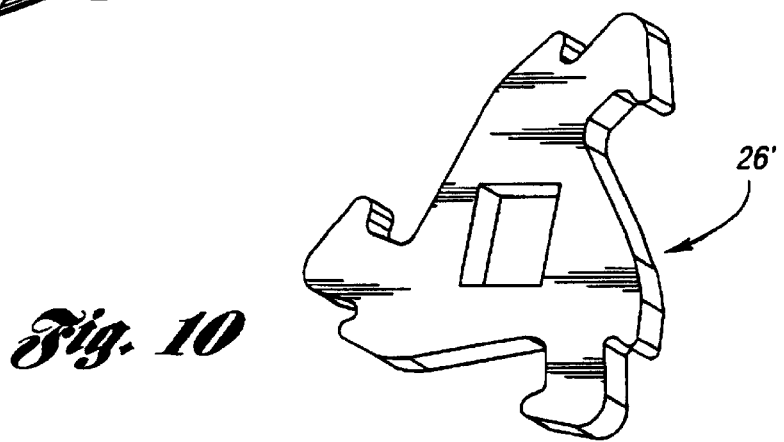
FIG. 10 shows a perspective view of a cam for use with the embodiment of FIG. 6.

Also, the rotary spring 38' shown in FIG. 8 includes a first end 68' engageable with a cam 26' shown in FIG. 10, and a second end 72' engageable with the base. The cam shaft 36 shown in FIG. 9 is substantially identical to that shown in FIG. 2. The rotary cam 26' shown in FIG. 10 is slightly modified in shape in comparison to that shown in FIG. 2, but substantially identical in function.

Figure 11:
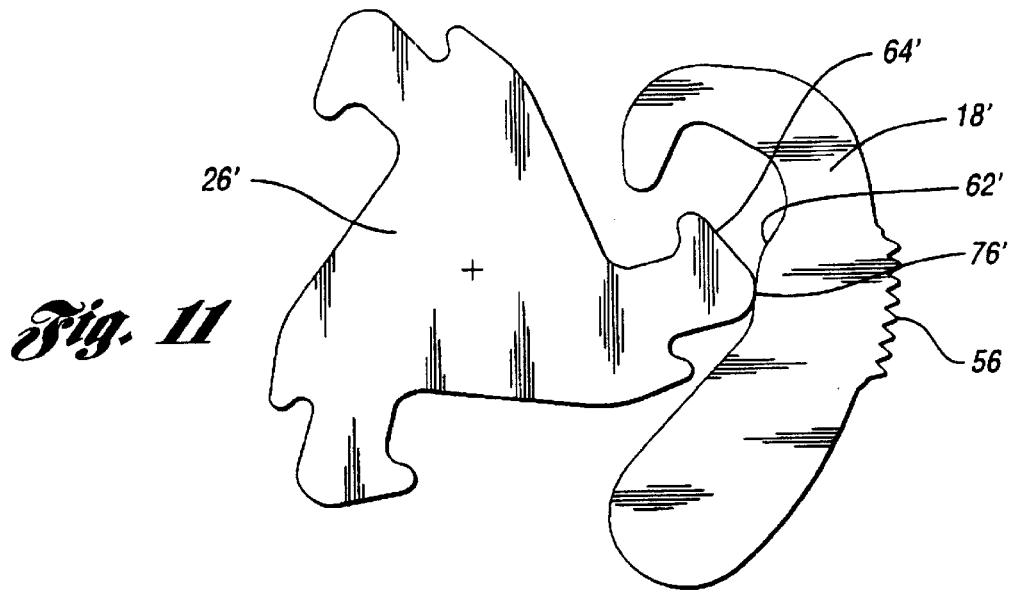
FIG. 11 shows a schematic plan view of a cam and pawl arm in the locked position in accordance with the embodiment of FIG. 6.
Figure 12:
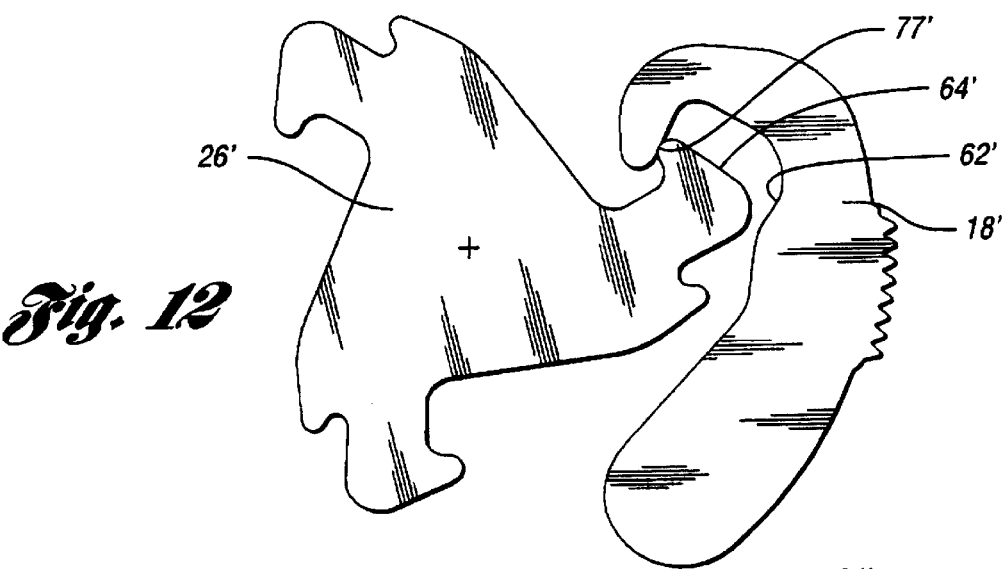
FIG. 12 shows a schematic plan view of the cam and pawl arm of FIG. 11 immediately prior to unlocking.
Figure 13:
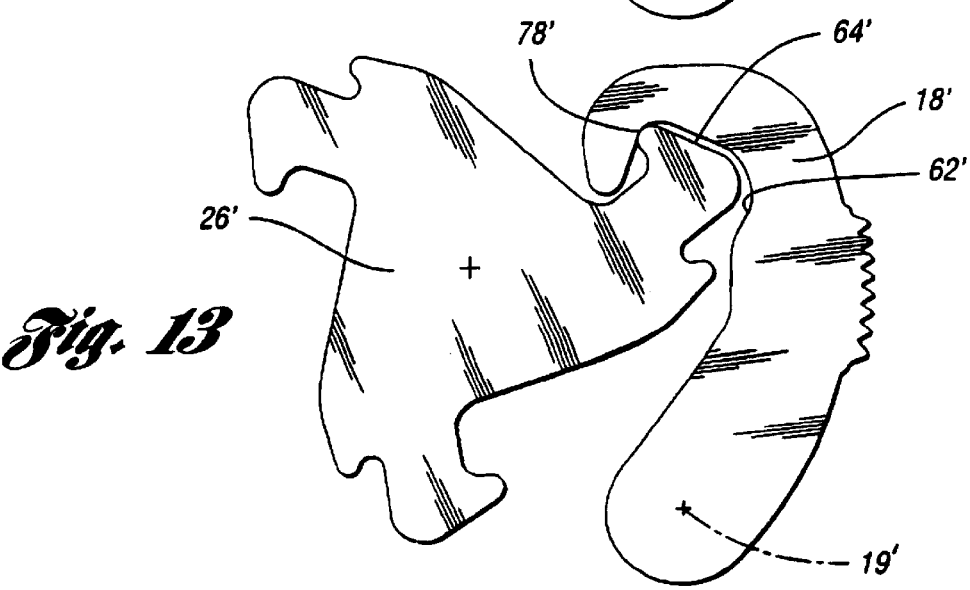
FIG. 13 shows a schematic plan view of the cam and pawl arm of FIG. 11 in the unlocked position.

FIGS. 11–13 show a sequence of cam 26' positions with respect to the pawl arm 18'.

FIG. 11 shows the cam profile surface 64' engaging the cam contour surface 62' at the contact point 76', thereby holding the pawl arm 18' in the locked position wherein the outer toothed portion 56 is engaged. Turning to FIG. 12, the cam 26' has been rotated 14° and the cam profile surface 64' has engaged the cam contour surface 62' at the contact point 77' to initiate unlocking. In FIG. 13, the cam 26' has been rotated 25°, and the cam profile surface 64' engages the cam contour surface 62' at the contact point 78' to hold the pawl arm 18' in the unlocked position in which it is rotated 6° about its pivot point 19' with respect to the locked position shown in FIG. 11. Accordingly, the embodiment of FIGS. 6–13 is substantially functionally identical to that of FIGS. 1–5.

While the best modes for carrying out the invention have been described in detail, those familiar with the art to which this invention relates will recognize various alternative designs and embodiments for practicing the invention within the scope of the appended claims.

What is claimed is:

1. A rotary-cam reclining device comprising:

a base adapted to be fixedly connected to a seat cushion;

an arm adapted to be fixedly connected to a seat back and rotatably connected to said base, and having an inner toothed portion;

first, second and third pawl arms each independently pivotally connected to the base, each said pawl arm having an outer toothed portion along an outer edge thereof engageable with said inner toothed portion, and further having a cam-contour surface along an inner edge thereof;

a rotary cam having first, second and third cam arms engageable with said first, second and third pawl arms, respectively, each said cam arm having a cam profile surface of the respective pawl arm for producing inward and outward radial motions of the respective pawl arm to mesh and unmesh the inner and outer toothed portions by a rotary motion of said rotary cam; and an operating lever mechanically linked to said rotary cam for producing the rotary motion of said rotary cam.

2. The rotary-cam reclining device of claim 1 further comprising a single spring biasing said rotary cam with respect to the base whereby each of said first, second and third pawl arms are biased into meshing engagement with the inner toothed portion.

3. The rotary-cam reclining device of claim 2, wherein said first, second and third pawl arms are radially spaced equidistantly about said base.

4. The rotary-cam reclining device of claim 2 wherein said single spring comprises a rotary spring connected at opposing ends to said base and said rotary cam.

5. The rotary-cam reclining device of claim 1, wherein said pawl arms, rotary cam and inner toothed portion are positioned along a common plane.

6. A rotary-cam reclining device comprising:

a base adapted to be fixedly connected to a seat cushion;

an arm adapted to be fixedly connected to a seat back and rotatably connected to said base, and having an inner toothed portion;

first, second and third pawl arms pivotally connected to the base, each said pawl arm having an outer toothed portion along an outer edge thereof engageable with said inner toothed portion, and further having a cam contour surface along an inner edge thereof;

a rotary cam having first, second and third cam arms engageable with said first, second and third pawl arms, respectively, each said cam arm having a cam profile surface that is in cam connection with the cam contour surface of the respective pawl arm for producing inward and outward radial motions of the respective pawl arm to mesh and unmesh the inner and outer toothed portions by a rotary motion of said rotary cam;

an operating lever mechanically linked to said rotary cam for producing the rotary motion of said rotary cam; and a single spring biasing said rotary cam with respect to the base whereby each of said first, second and third pawl arms are biased into meshing engagement with the inner toothed portion.

7. The rotary-cam reclining device of claim 6, wherein said first, second and third pawl arms are radially spaced equidistantly about said base.

8. The rotary-cam reclining device of claim 6 wherein said single spring comprises a rotary spring connected at opposing ends to said base and said rotary cam.

9. The rotary-cam reclining device of claim 6, wherein said pawl arms, rotary cam and inner toothed portion are positioned along a common plane.

* * * * *